(12) United States Patent
Harrington et al.

(10) Patent No.: US 7,885,928 B2
(45) Date of Patent: Feb. 8, 2011

(54) DECENTRALIZED ADAPTIVE MANAGEMENT OF DISTRIBUTED RESOURCE REPLICAS IN A PEER-TO-PEER NETWORK BASED ON QOS

(75) Inventors: Steven J. Harrington, Webster, NY (US); Hua Liu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 500 days.

(21) Appl. No.: 11/683,758

(22) Filed: Mar. 8, 2007

(65) Prior Publication Data

US 2008/0222154 A1 Sep. 11, 2008

(51) Int. Cl.
*G06F 17/30* (2006.01)
*G06F 15/16* (2006.01)
(52) U.S. Cl. ............... 707/637; 707/698; 709/201; 709/226; 718/105
(58) Field of Classification Search ............... 707/200, 707/614, 637
See application file for complete search history.

(56) References Cited

U.S. PATENT DOCUMENTS 5,832,514 A * 11/1998 Norin et al. ............... 707/202

| | | | |
|---|---|---|---|
| 2003/0167295 A1* | 9/2003 | Choo ............... | 709/104 |
| 2004/0088331 A1* | 5/2004 | Therrien et al. ............... | 707/200 |
| 2006/0168154 A1* | 7/2006 | Zhang et al. ............... | 709/220 |
| 2006/0253504 A1* | 11/2006 | Lee et al. ............... | 707/203 |
| 2006/0271530 A1* | 11/2006 | Bauer ............... | 707/5 |
| 2009/0037451 A1* | 2/2009 | Borrill ............... | 707/101 |

OTHER PUBLICATIONS

Giwon, On et al., "The Effectiveness of Realistic Replication Strategies on Quality of Availability for Peer-to-Peer Systems", Dec. 9, 2004.*

* cited by examiner

*Primary Examiner*—Tony Mahmoudi
*Assistant Examiner*—Brittany N McCue
(74) *Attorney, Agent, or Firm*—Fay Sharpe LP (57) ABSTRACT

Methods and systems are provided relating to a decentralized algorithm for managing replicas of a resource in a peer-to-peer network to satisfy quality of service requirements. Individual nodes within the network storing a resource replica continually monitor the node performance against quality of service (QoS) parameters and when necessary, take appropriate action to either add or delete the resource, all the while informing the other nodes within the network that maintain a replica of the resource of the particular action for dynamic fluctuation of the count of resource replicas therein.

21 Claims, 6 Drawing Sheets

DECENTRALIZED ADAPTIVE MANAGEMENT OF DISTRIBUTED RESOURCE REPLICAS IN A PEER-TO-PEER NETWORK BASED ON QOS

TECHNICAL FIELD

The presently disclosed embodiments are directed to peer-to-peer ("P2P") networks where users may repeatedly locate and access entities such as resource tools, file copies and the like and wherein a plurality of replicas of the entities may be distributed throughout the network at different nodes therein. The embodiments are more particularly directed to a decentralized adaptive management method and system to dynamically adjust the number of resource replicas based upon selected quality of service ("QoS") factors comprised of local and real time entity request processing.

BACKGROUND

The dynamic nature of business has posed big challenges on information technology ("IT") infrastructures to guarantee QoS when resource needs increase dramatically and maybe un-predictably. In the past, several different models for accessing resources have been used. In the early days of computing, there was a single shared mainframe. Administration was relatively straightforward, but connection and competition for resources could be a problem. In the days of personal workstations, each individual could have his or her own instances of resources and applications, but administration of all the replicas and the sharing and coordination of them could pose complications, delays and other problems. In today's networked and peer-aware systems, resources need not be local but may be available from some set of peers.

There is a need for an approach that lies somewhere between the centralized and the localized models, and that would allow one to find a resource without having it installed locally which is an advantage over the localized approach, and can offer multiple locations for a desired resource that would avoid the bottlenecks and single-source vulnerabilities of a centralized server. One envisioned application is a network of cooperating multi-function devices within an enterprise. Such devices could share data such as fonts, forms, or schemas, and could share software applications such as rasterizers (RIP) or optical character recognizers (OCR).

Replicating resources at multiple sites provides robustness and improves performance, but replication by itself is not a solution for improving or meeting QoS requirements. One issue, for example, is how to manage an optimal number of resource replicas. Having too few available replicas of a popular resource results in the bottleneck problems that a centralized server faces, while having too many replicas can be inefficient and costly in terms of things such as extra hardware requirements or license fees. It is desirable that the number of resource replicas can dynamically change by replicating during peak times to handle requests in a timely fashion and reducing the number during less busy times to leave spaces for other busy resources to use.

Finding the optimal number of resource replicas is straightforward if real time requests for a resource can be collected at a central entity which can then dynamically calculate the optimal number based on QoS metrics. In loosely-coupled or large environments, however, such knowledge is difficult or impossible to obtain. Further, single-point failure becomes an issue with the centralized entity. Decentralized mechanisms using only local knowledge is another solution, but questions and problems arise such as: How to distribute the management functions? How to make globally consistent decisions in a decentralized manner? How resource requesters locate resource replicas? How to add or delete a resource replica? How to advocate newly added replicas? How to balance workload across replicas?

Thus there is a need for a scalable solution for finding the optimal number of resource replicas to meet QoS requirements, and for locating and managing resource replicas to achieve load balance and maintain QoS with the fleet of replicas during resource needs change.

In pure P2P systems, peers have been enabled to find a resource typically through hashing functions without relying on a centralized index server. Hashing functions provide a mechanism by which one can look up a name or identifier (for a resource item) and acquire that entity's location. In this approach, there is no single point of failure in the system. The distribution of such entities or resources within a P2P network has been facilitated using a hashing function to compute a numeric designation or index of either a node within the network, or a resource entity to be stored within the node.

A hashing function can convert an identifier x (such as a name, type, or description) into an index $i=H(x)$. A resource is mapped to a node by hashing its identifier to a node index. Users can locate the residing node of a resource by using this approach. But hashing functions provide a single mapping from resource identifiers to node indexes. If users use the same resource identifier to locate replicas, they end up using the same resource replica every time even when there are other replicas in the network. By "node" it is intended within the described embodiments to include a computer, disc system, data base, multi-function device or any other kind of storage and computation medium. "Resource entity" can include data records, software processing systems, services, or the like.

In another example, and one which is a common experience to entertainment industry customers, one could map the name of a music or film file to a node and then use that node to store the file. Anyone seeking the file could also map the name to discover the node where it is stored and request a copy of the file from that node. However, if there is a large demand for the file, then the node where it is stored could become a bottleneck. Merely placing many copies of the file on many nodes distributes the cost of the file transfer to many nodes, and protects against loss due to failure of one node. However, it still leaves the locating of the file to be performed by a single node. If the load becomes sufficiently heavy, this node can still become a bottleneck, and it is still a single point of failure. What is needed is a simple distributed scheme for locating the resource. One could then distribute and backup the resource location information and process as well as the resource itself. In addition, the number of copies of a resource (or its location information) may change dynamically. One day a particular song may be popular and place large demands for retrievals, while the next day, a different song may be popular, and it would be better to use storage for the new song instead of the old one. It is desirable to have a simple method for dynamically adjusting the number of copies in order to respond to changes in user queries and/or system and still meet quality-of-service requirements.

Figure 7:
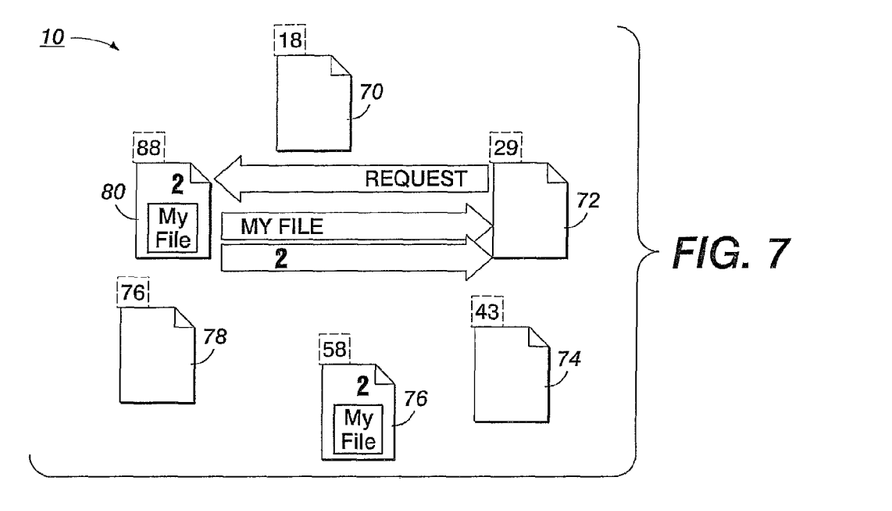
FIG. 7 is a block diagram illustration of the initial copy retrieval, analogous to FIGS. 1 and 4.

With reference to FIG. 7, six nodes, 70, 72, 74, 76, 78, 80 in a P2P network are illustrated wherein each node has an identifier, e.g., a computer name, which is processed by the hashing function to produce a corresponding set of numbers that correspond to the node identifiers. In this example, the hashing function computes a numeric identity for node 70 of 18, node 72 is 29, node 74 is 43, node 76 is 58, node 78 is 76 and node 80 is 88. File names for all resource entities are similarly hashed by the hashing function to determine a hashed numeric identification for each resource entity. In one embodiment, the value of the resource entity hashed number determines its stored location. For example, all resource entities having a hashed value between 1 and 18 could be stored in node 70, resource entities having a value between 19 and 29 could be located in node 72, those between 30 and 43 are stored in node 74, and so on. The correspondence between the resource entity thus determines a location thereof within the network, and by knowing the particular hashing function and the resource entity identifiers the hashing function enables a requestor of the particular resource entity to determine in what node within the network it should be stored. However, such a distributed hashed table system merely facilitates the disposition of a singular resource entity within a singular node within the network. Existing P2P systems just provide a means to locate a resource or resource set, but do not answer the question of how many replicas of a resource are needed to achieve an acceptable QoS. And while P2P systems can maintain the directory of resources locations, they do not indicate how to maintain QoS as nodes join or leave the system or as resource needs change at runtime. No mechanisms are provided to manage resource replicas in an adaptive fashion. Traditional methods to achieve load balance among replicas depend on a central dispatcher, which has low scalability and single-point failure. As noted above, when a particular resource entity incurs an increased volume of requests from any single or a number of users, a bottleneck can occur in the network and the QoS to the user suffers.

Thus, there is also a need to extend existing peer-to-peer systems with capabilities to evaluate QoS and enable QoS based management of resource replicas in a decentralized and efficient manner, and for improved processing of distributed networks that can accommodate an optimal number of resource replicas.

SUMMARY

Resources can be replicated on demand across a network, and doing so can remove bottlenecks and improve overall quality of service of the fleet of resource replicas such as response time, however at costs such as storage consumption, licensing fees, and management overhead. The subject embodiments comprise a decentralized approach to dynamically adjust the number of replicas with only local knowledge of a node in an efficient way. It is intended for scenarios where users repeatedly locate and access entities and is suitable for peer-to-peer networks. It provides high availability of resources, load-balanced access, bounded response time, simple management, and dynamic adaptation to workload requirements.

A simple decentralized scheme adds or removes copies of resources to satisfy certain QoS requirements for resource queries in a dynamic environment.

The method requires a means to access any of N possible resource copies (such as a P2P distributed hash table applied to resource instance names that are algorithmically generated). Resource providers maintain the current count of copies (N) and a measure of its local QoS behavior. Resource requestors also maintain the current count of copies (N) and select a resource at random from the (N) copies. If a resource request times-out without being fulfilled, the requestor can select a different source and try again. With each request, the requestor updates its count of copies to match that of the resource source.

When any of the resource providers notice QoS degrading (for example, the response time exceeds a certain threshold), it duplicates the resource on another node and as a result the new copy can take some load off all the replicas. Similarly, if one resource provider finds that request declines, it will delete one copy to save space and let the remaining copies be more productive. There is the minimal number of copies in the system (for example, by taking the node failure rate into consideration), so that at least one copy should be available at any given time. In this way, popular resources are automatically allocated with more space while infrequently used resources release space, which leads to an efficient utilization of limited system space. This method allows for each resource provider to independently make the decision to delete or duplicate copies based only on its local knowledge. A requesting node randomly chooses one resource provider to query for resources, and as a result the query load is balanced among resource providers.

A system is thus provided for adjusting the number of replicas of a resource within a distributed network wherein a network node dynamically and independently adds or deletes a replica based on demand for the resource. Each node having one of the replicas includes a record of the N replicas within the network and adjusts and communicates the number N upon addition or deletion of the replica to other nodes still storing replicas.

DETAILED DESCRIPTION

The several embodiments disclosed herein relate to a decentralized algorithm for managing replicas of a resource in a peer-to-peer network to satisfy quality of service ("QoS") requirements. Three principal components for satisfying a QoS comprising a minimum number of replicas within the network, a process for adding new replicas when the QoS threshold is not met, and an alternative process for removing replicas when a different QoS threshold is crossed indicating an excessive number of replicas exist. Individual nodes within the network that maintain any of the resource replicas can continually monitor the nodes' performance against the QoS parameters and, when necessary, take appropriate action to either add or delete the resource, all the while informing the other nodes within the network that maintain a replica of the resource of the particular action. Thus, the dynamic fluctuation of the count of resource replicas provides a highly efficient maintenance of available replica supply to accommodate an improved and efficient access to the resources. The nodes know the number of copies that exist for each resource they maintain and using a hash function, the resource name and replica count of every node measuring the resource demand can be identified. All this information is used to synchronize nodes in real time when adds and deletes occur.

Figure 1:
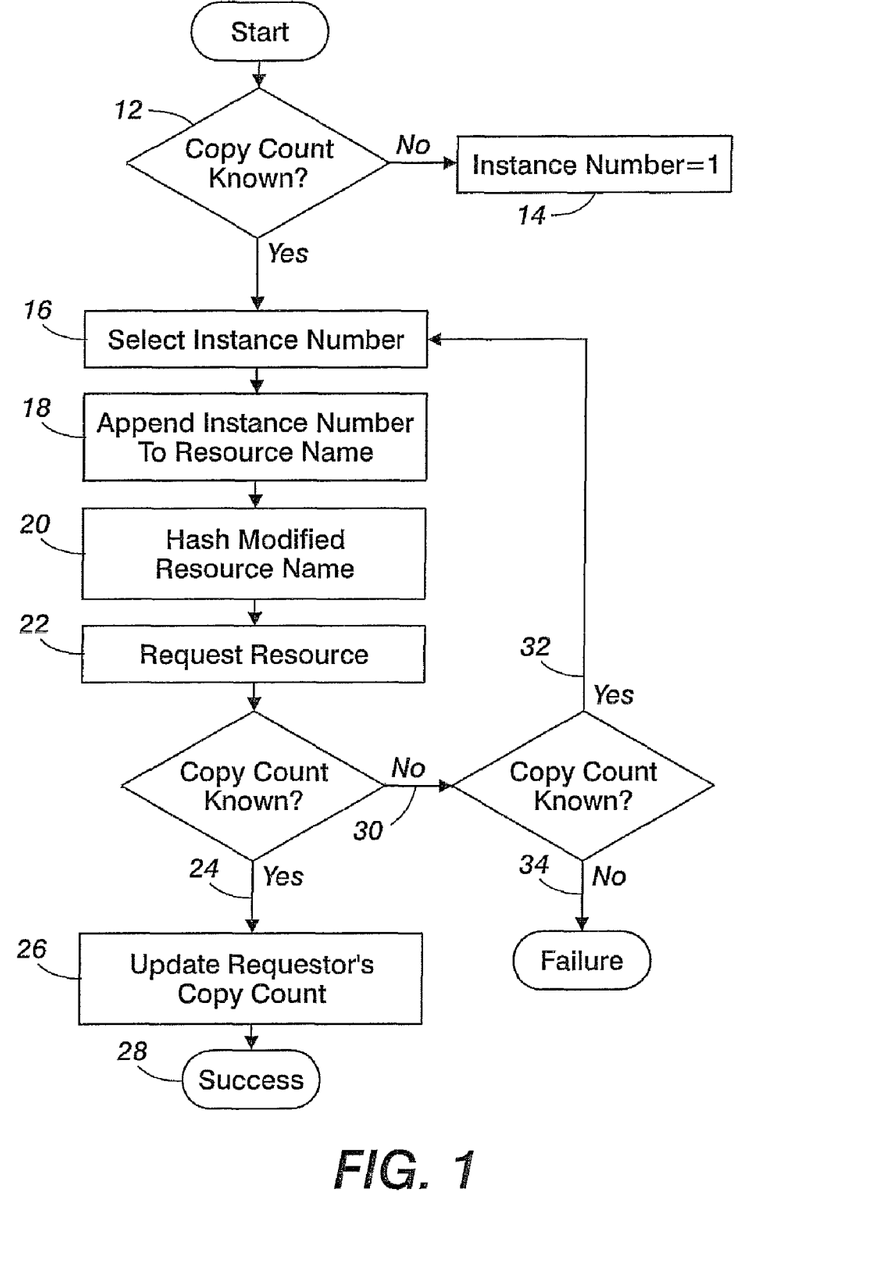
FIG. 1 is a flowchart identifying a process of requesting a resource from a node in a peer-to-peer node network.
Figure 4:
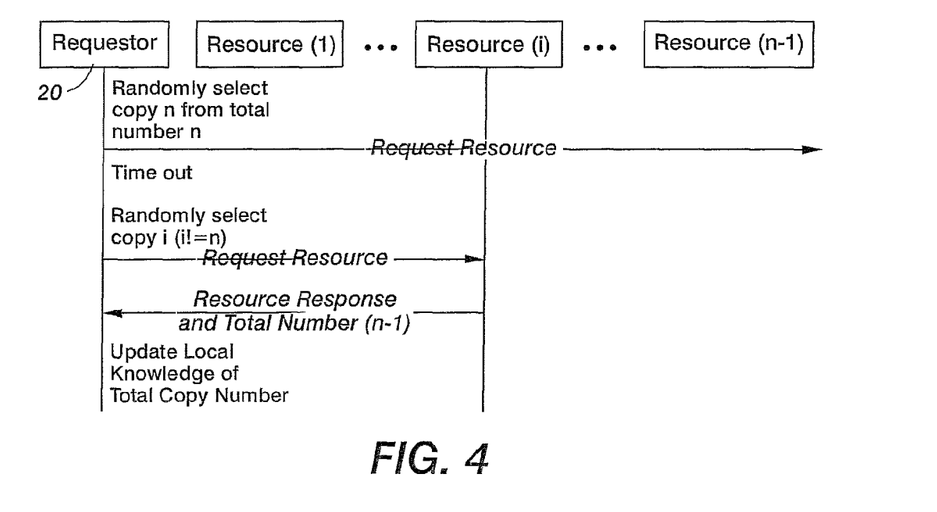
FIG. 4 is a timing flow diagram illustrating an initial request of a selected resource from a network, analogous to the flowchart of FIG. 1.

More particularly, and with reference to FIGS. 1, 4 and 7, a peer-to-peer ("P2P") network 10 is comprised of a plurality of network nodes 70, 72, 74, 76, 78, 80 all of which can be identified by a numeric index identifier computed from a hashing function and a selected node identifier. For example, node 70 has a computed hash numeric index of 18, for node 72 it is 29, for node 74 it is 43, for node 76 it is 58, for node 78 it is 76 and for node 80 it is 88.

In response to a request for a particular resource within the network by requestor 20, wherein the requestor has never asked for the resource before, the requester can not know the total number of replicas within a network, but it still knows that there is a replica copy within the network ("replica" or "copy" are used interchangeably herein.) So if the copy count of replicas within the network is unknown 12, the requester must select copy 1 so it can be appended to the selected resource identifier for hashing computation of an address of a node containing the first replica resource within the node network. Alternatively, if the requester knows that there is a number N within the network, it may randomly select an instance number i between 1 and N that can be appended 18 to the resource name so that the modified resource name can be hashed 20. Random selection of a number between 1 and N is intended to evenly distribute the request load across the set of replicas within the node network. It should be noted that the appending of an N value to the resource name is different than the hashing system discussed above in the Background.

If a resource has been requested 22 from a node which contains the desired resource, then the returned resource may advise the requester of the correct copy count of replicas within the network 24 so that the requestor's copy count can be updated 26. In such a successful 28 access the resource can be obtained from the network with minimal problems and the avoidance of bottleneck jams. If for some reason the node from whom the resource is requested does not know the copy count, and does not have the resource, then another instance number may be selected 32 for requests from another node. In some instance there may be a time-out failure 34 such as when a special number of requests have been made incurring a failed response.

In such a system, it can be seen that the individual nodes maintain a number N of replicas within the node network that can be communicated to a requestor upon a successful resource request.

FIG. 7 illustrates a node 72 that has initiated a request for a resource "my file" from node 80. Node 72 knows that the requested resource, "my file", is in node 80 by hashing the "my file" identifier with either the numbers 1 or 2 (i.e., 2 being the total number of replicas within the network) and when hashing with N=2, node 80 is addressed as a result of a hashing numeric identifier corresponding to numeric identifier between 88 and 99 inclusive of node 80. Upon supply of the resource "my file" back to node 72, in addition the replica number N=2 is also returned therewith so that node 72 now knows that another replica exists within the network. If the "my file" identifier is hashed with the other replica number within the network, i.e., N=1, it will presumably hash to node 76. Such a hash appended instance number of 1 to the resource name will apparently hash to and address numeric identifier between 58 and 75 inclusive of node 76.

Accordingly, a successful resource request requires the requester to know the upper limit N of valid replica numbers. By storing the count of available replicas within the network, and returning the count number to the requester along with the response resource data, the requester is allowed to update its local knowledge of the total copy numbers, N within the network. Only the first time that a resource is requested, the requester must assume that there is at least one replica and must contact the node corresponding to instance number 1, but after a successful request from replica 1, the local count value can then be revised to match the true value.

The subject embodiments do not require any particular method for determining the minimal number of copies, but in one approach, the minimal number of copies can be determined on the node failure rate $P_d^m$. The availability of a resource r is the probability of successfully accessing r, denoted as $P_{availability}(r)=1-P_d^m$, where m is the number of copies. For example, if the node failure rate is 0.1 and we want the availability to be 99.9%, we need three copies of the resources. The actual number of copies may change at runtime. This avoids a bottleneck at a single node.

An advantage of the subject embodiments is that even though the local value of N may be different in individual requesters depending on their frequencies of requests for service and the rate of creating or deleting replicas, the system continues to dynamically adjust replica count with high efficiency. Note that it is not critical to have correct information about the true value of the number of replicas within a network. However, when a request is made and the service access fails (e.g., a time-out at the requestor's site), the requestor just selects a different replica number and tries again. For example, if the local value of N is 5 but the current value is 3, requests sent to replica 4 or 5 will timeout or receive error responses, and the requester will automatically choose a different number, eventually selecting one between 1 and 3. After a successful request, the local value of N is updated so that a greater simplification in the management of service replicas is achieved since one only needs to maintain the information in the service instances, and does not have to worry about service users. Service users will automatically update and maintain their information during the course of service use.

The number of trials that a requestor makes to access a service has impact on requestors' experience of QoS. For example, in an unacceptable case, if the current replica number is 1 while a requestor's local knowledge is N, it may take the requestor N trials to find the replicas using a sequential trial selection. Given an incentive to minimize the trail numbers, the random selection of a number between 1 and N can avoid the delays in a sequential selection process. For example, if the current number N in the system is N' first the requestor randomly chooses a number I between 1 and N, and sends a request to the service replica on the corresponding node. If the access is successfully accomplished, the current N' is then returned to the requestor along with response data. This means either (1) N' is larger than N, or (2) N' is less than N but i is between N and N'. If the access fails, the requestor would know that replicas have been removed and current value N' is less than i. In order to minimize trial numbers, a binary search is used to find the next replica number between 1 and i until a successful access occurs. In one embodiment, an untried selected number is selected as the closest integer less than the average of both the last number selected at random and one (1).

This method guarantees trial numbers as 1 in the best case and $\log_2 N$ in the worst and average cases with requesters' local knowledge.

The embodiments described above solve the bottleneck problems due to unique mappings between identifiers and corresponding nodes. Further, they achieve load balance across service replicas without central control. However, it leaves open the issue of just how many replicas are needed within the network. As noted above, it is the stated objective to give the subject embodiments autonomical behavior to add or remove replicas as needed to achieve optimal performance with respect to some QoS. QoS measurements to judge whether there are too many or too few replicas can comprise detecting such factors as detecting one of request response time, node queue length, node storage space consumption, node service competition, node resource utilization, node load balancing, request scheduling, processing cycles consumption or peripheral availability. The QoS measurements can easily replace other measurements or be extended for different purposes, since the methods of the subject embodiments are generic and decoupled from any specific QoS measurement.

For example, when the need for additional replicas is triggered by excessive load that results in a decrease in a QoS measure such as a long response time, a function $N=\Phi(qos)$ is used to calculate N based on current QoS. While any QoS measure that responds to the number of replicas can be used as a trigger, response time is used here as the example. The response time is defined as $T_{resp}=T_{wait}+T_{proc}$, where $T_{wait}$ indicates how long a query waits in the queue and $T_{proc}$ is its processing time. Defined in service contract, $T_{proc}$ of a service can be consistent or variable to different types of requests. For example, processing time to OCR for a document depends on the size of the document and the number of figures in the document. Assuming $T_{proc}$ is pre-known. $T_{wait}$ depends on sequencing policy used in service queues, for example, $T_{wait}$ of a request is proportional to the queue length before it if sequencing policy is FIFS (First In First Serve). In a simple implementation, when the queue length exceeds a certain threshold, the service provider anticipates that it cannot guarantee bounded response time and then duplicates one replica on another node. If the current number of replicas is N, the node appends N+1 to the service identifier, finds the service provider for the N+1$^{th}$ replica using $i_{S_{N+1}}=H(S_{N+1})$, then duplicates the service on the new node, and finally notifies other replicas to increment their local replica counts by 1. Note that locking mechanisms can be added to prevent race conditions from multiple nodes attempting to alter the number of replicas simultaneously. This, however would not prevent multiple nodes from simultaneously feeling the need to change the number of replicas and each enacting a change sequentially, thereby amplifying correction to the response to the problem.

Note that none of the service requesters are aware at the time when new replicas are added or old ones are removed. But whenever one of them makes a request, it updates its count to the new value. Since it will take a little while for requesters to learn of the change, it is possible that another service replica will cross the QoS threshold and want to add or delete replicas before the change that was already made takes effect.

There are several ways to avoid immediately triggering more or less replicas, for example enforcing time delay to note whether the average request behavior is increasing or decreasing over some time window. However, window size is difficult if not impossible to define due to lack of global knowledge and unpredictability of requesters' behaviors. Our approach is to have service requesters report their local replica counts along with their service queries, and service replicas then can differentiate old and new requesters (new requesters are those with updated replica counts).

Suppose a new replica (N+1$^{th}$) is added, and then the request volume coming from old requestors will be distributed to N+1 replicas after some time. The old N replicas multiply N/(N+1) to the number of old requestors in their queues when computing QoS, which virtually offloads some requests to the new N+1th replica and immediately integrates the impact of the new replica into QoS calculation. The new N+1th replica will not make any decision until the request volume it receives becomes stable or an update of new count number is received.

Figure 2:
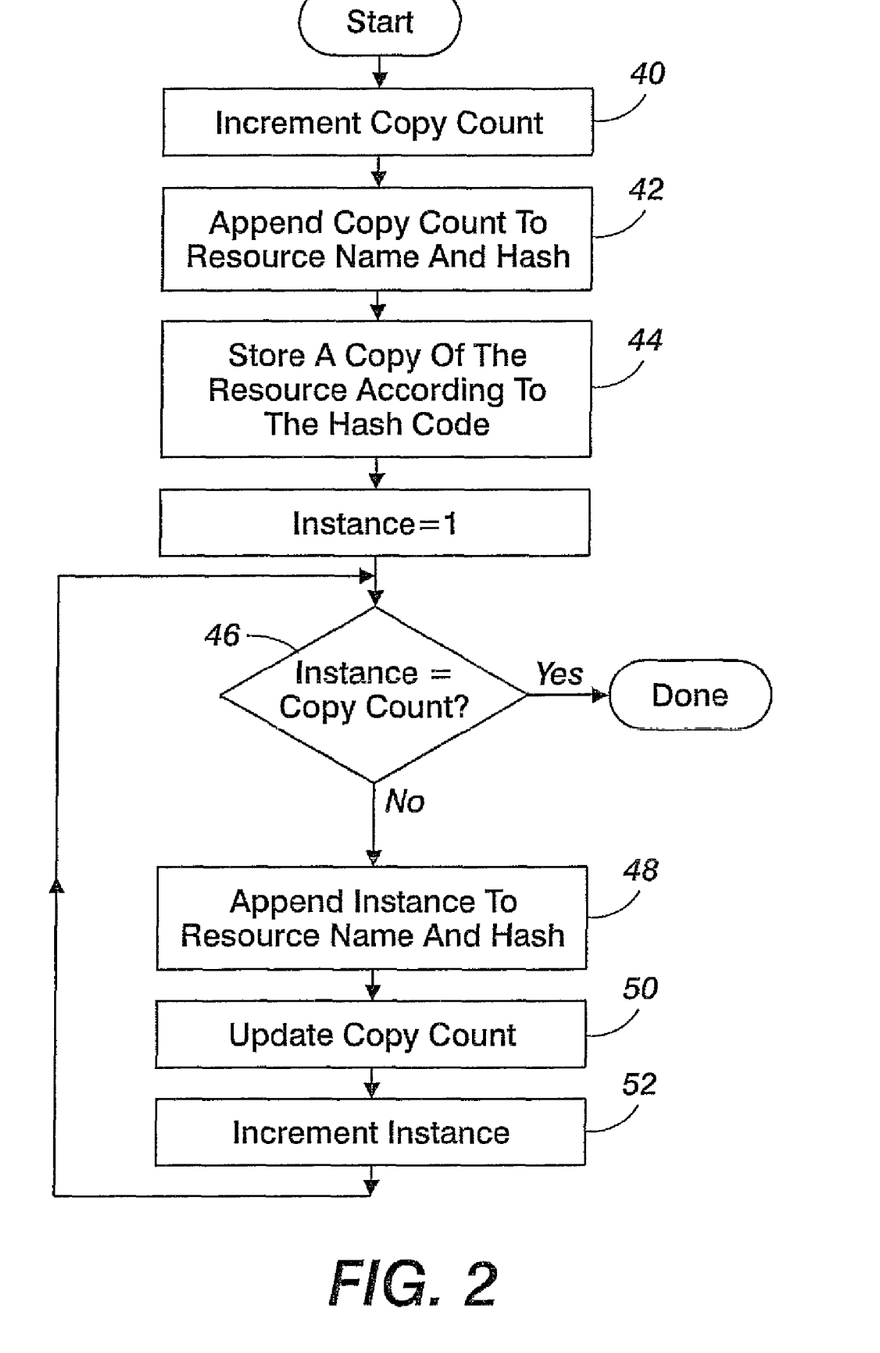
FIG. 2 is a flowchart illustrating a method for incrementing the number of replicas of a resource within that network.
Figure 5:
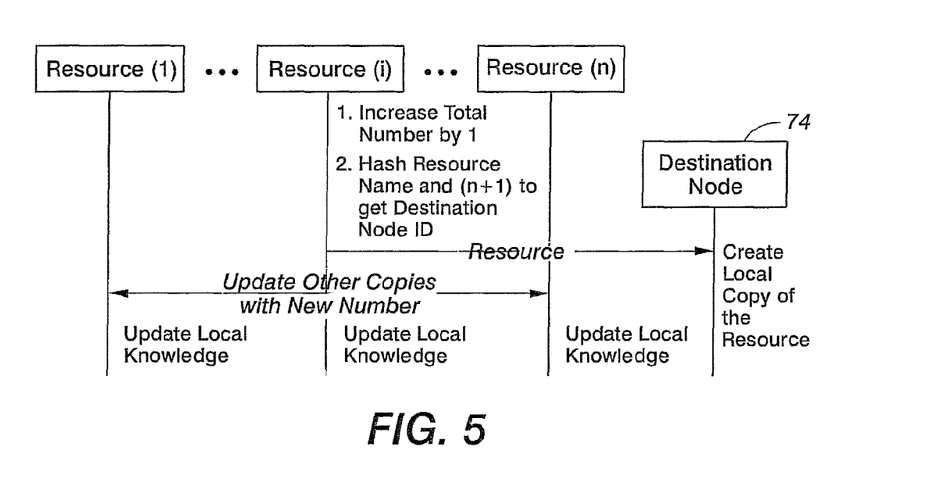
FIG. 5 is a timing flow diagram where an increase in replicas is determined, analogous to the flowchart of FIG. 2.
Figure 8:
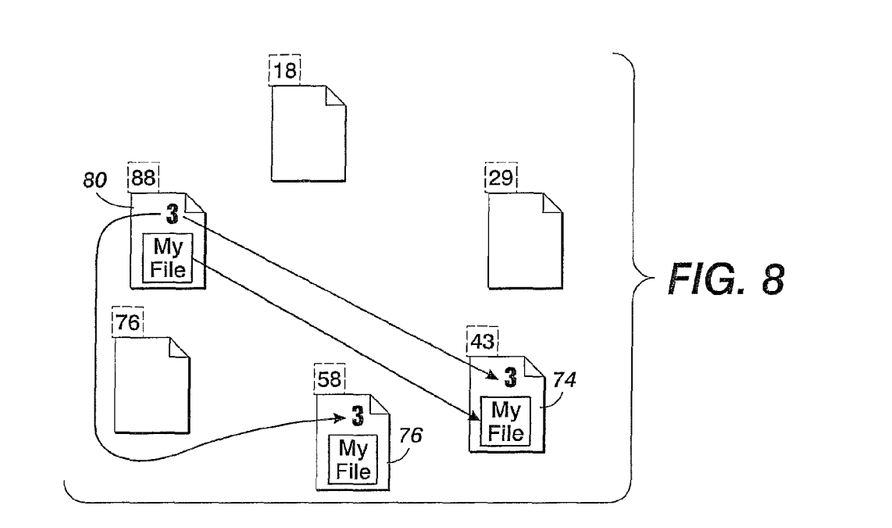
FIG. 8 is a block diagram illustration of a replica copy increment, analogous to the illustrations of FIGS. 2 and 5.

With references to FIGS. 2, 5 and 7, the Figures illustrate incrementing the number of replica copies within the network based upon a determination that a QoS threshold indicating a need from a replica has been crossed. In such instance the resource i which has determined a failure in QoS will increase the number N by 1 and append the new copy count to the resource name to compute a hash identifier for a new destination node 74. FIG. 8 shows that nodes 80 and 78 had the resource "my file" with a number of replicas needed to be incremented. By appending the new copy count executing the hashing function 42, node 74 is identified as the new destination node to receive the new replica of the resource "my file". The resource "my file" is then stored 44 in node 74 with the new total value of N replicas within the network, e.g., 3. The instance numbers of replicas need to be updated for all the replicas within the network so that the instance number equals the correct copy count of 46. All of the instances of replicas within the network are appended then to each resource name and hashed 48 to compute the appropriate identifier therefor. The copy count is updated 50 and this can be sequentially executed for all the new incrementals numbers of replicas within the network.

As seen with reference to FIG. 5, all of the other copies within the network have their local knowledge updated with the new number of replicas within the network.

Figure 3:
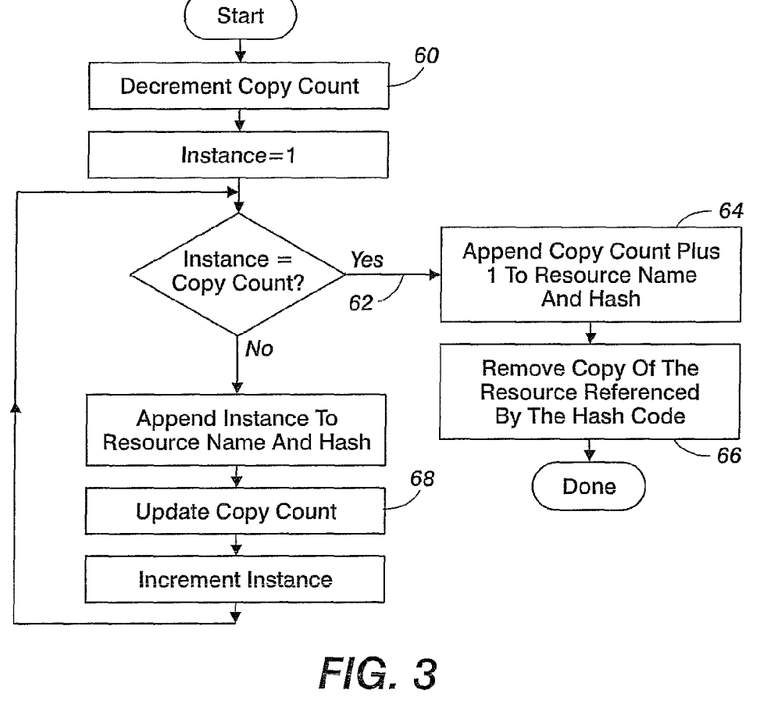
FIG. 3 is a flowchart illustrating a process for decrementing the number of replicas within the network.
Figure 6:
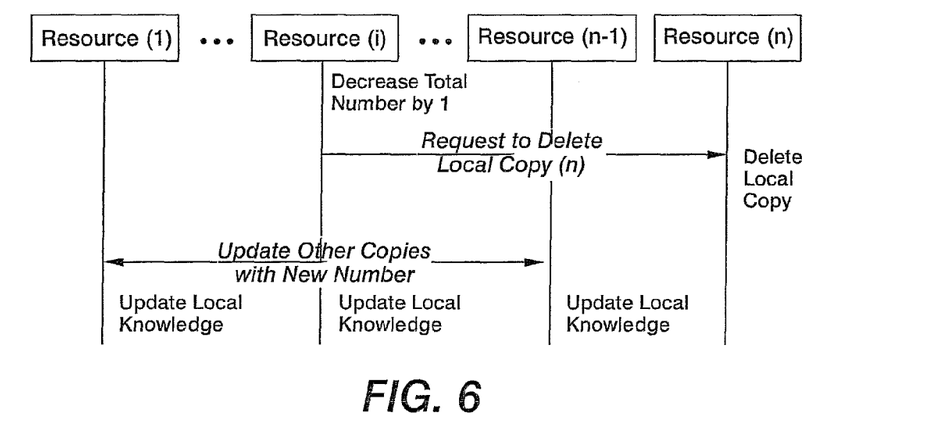
FIG. 6 is a timing flow diagram illustrating a decrement in the replica copies, analogous to the flowchart of FIG. 3.
Figure 9:
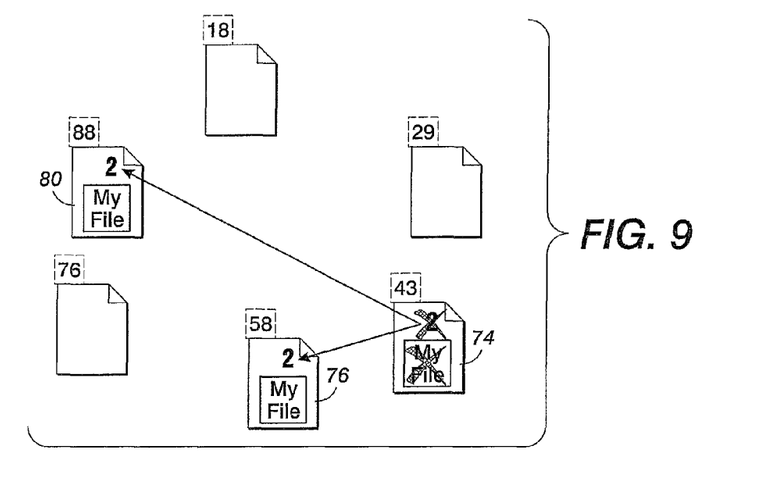
FIG. 9 is a block diagram illustration of a decrement in the number of replica copies, analogous to FIGS. 3 and 6; and, FIG. 10 is a block diagram illustrating a request from a node in the network wherein the resource has already been removed so that the resource must be requested from a different node.

With reference to FIGS. 3, 6 and 9, removing a replica within the network can also be triggered by some QoS measure. Again, there is freedom in the choice of the measure used to trigger the removal of a replica. It might be the consumption of too much space, or the competition by other services. However, if a measure different from that for adding replicas is used, then care must be taken to assure that a stable range of replica counts exists or that some priority is assigned so that one is not attempting to add replicas and remove replicas simultaneously. As an example resource utilization is discussed here. Function $N=\Phi(qos)$ is defined in the way to find the minimal N satisfying QoS measurement. When a smaller N is found, the node initiating replica removal first notifies other replicas to decrement their local replica counts by 1 to prevent the N$^{th}$ replica from being accessed, and then deletes the N$^{th}$ replica.

It is possible that after replicas are already removed, requests increase to trigger duplicating the same replicas maybe on the same nodes. Here we apply lazy releasing policy to avoid unnecessary overhead in creating replicas. When a smaller replica count is required, replicas with indexes larger than the new count are marked for removal and will not be accessed. These replicas, however, are still alive in the system. These replicas are physically removed when other services compete for their resources. Lazy releasing eliminates the complexity in service replica deployment and results in prompt availability of service replicas.

If spaces (nodes in our case) are limited, it's possible that more than one replicas of different services are hashed to the same node, which can only host a certain amount of service replicas. A simple policy applied here is to have the ones with higher QoS gain win, and others will be sent to other locations through a second hashing or stop duplicating after a certain number of failures. The count of failed trials is an adjustable system parameter. The QoS gain of service x is calculated as $(QOS_{x,new} - QOS_{x,old})/QOS_{x,old}$, where $QOS_{x,old}$ is its current QoS value and $QOS_{x,new}$ is its estimated QoS value after adding a new replica.

Replica removal due to low utilization is called voluntary removal, while replicas can be involuntarily removed when hosting nodes shut down due to failure. Note that when a node leaves the system, its residing services will be automatically moved to its direct predecessor or successor by the underlying peer-to-peer overlay. In this situation, the replica is not removed but relocated, and this is transparent to service requesters and other service replicas. As a result, we do not consider this situation. However, requesters cannot differentiate the other two situations, since both situations might result in access time-out. A third situation resulting in time-out is that replica is overloaded.

Under the above three situations, requesters randomly try another service replica and at the same time notify the alternative replica of the time-out with former replicas. The alternative replica then can differentiate the three situations. In voluntary removal, the current replica knows that the replicas on the former replicas have been voluntarily removed, and will not attempt to recover them. If a replica receives 2nd, 3rd or more trials while its local QoS value does not cross the threshold, it can infer that the former replica(s) are gone and start to duplicate replicas using the identifiers of these involuntarily removed replicas, instead of increasing replica count. If a replica receives 2nd, 3rd or more trials and observes its local QoS value exceeds the threshold, it will start duplicating replicas. Note that all the above actions are only based on the replicas' local knowledge, and as a result it avoids the overhead caused by requiring and updating global knowledge.

With particular reference to FIG. 3, when a decision has been made to decrement the copy count, the true value of the value N replicas within the system becomes N-1. When the instance equals this desired copy count of N-1, i.e. equals a copy count of N-1, 62 the copy count plus 1 is appended to the resource name and hashed 64 to identify the stored node from which the copy should be removed 66 thereafter. The copy count for each node remaining having a store copy of the replica has been updated 68. Thus, with reference to the example of FIG. 9, the replica within node 74 is removed and the copy counts of the remaining replicas in nodes 76 and 80 are adjusted back to N=2.

Figure 10:
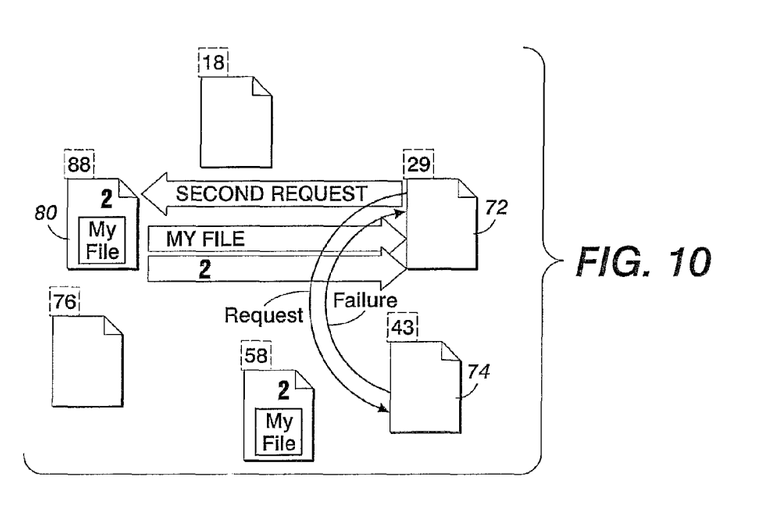

With reference to FIG. 10, an example of a situation when a resource replica that has been removed is requested so that the request fails, the resource must be sought from a different node. In this case, node 72 has requested a resource from node 74 from which "my file" resource had been removed as a result of the decrementing process of FIG. 9. Accordingly, there is a failure to the request for the file from node 74. The requester then selects another number between 1 and the failed attempt, this time ending up with a node address of node 80 which actually contains a replica of "my file" so that "my file" can be successfully communicated to node 72 along with the updated copy count, e.g., "2", back to node 72. Thereafter, node 72 will know not to request any further replicas of the resource from node 74. In another embodiment, the decrementing result of the resource entity replica until such time as its removal is necessitated.

Multiple replicas can be added at the same time to accommodate a suddenly dramatic increase in the need for a resource. Similarly, multiple replicas can be removed simultaneously. Since adding replicas takes a visible amount of time, we apply incremental adjust to replica counts, such that a new replica can be immediately used after it is completely deployed even while other replicas are still being created.

Because requests are assigned to various replicas randomly, each replica should experience the same average request rate. Thus, each service replica can independently calculate the QoS measure on its own local events and has some assurance that similar behavior is taking place at each of the other replica sources. Roughly at the same time, all the replicas independently make the same decision of adding or deleting replicas on the same node using the same naming mechanism and hashing function. But only one replica, usually the first one who makes the decision, performs the action, while others wait for an update.

The claims can encompass embodiments in hardware, software or a combination thereof.

It will be appreciated that varieties of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for distributing a plurality of replicas of a resource entity in a peer-to-peer node network for enhanced quality of service access by a resource entity requestor, comprising:

providing a first plurality of replicas of the resource entity in selected nodes of a first plurality of nodes;

designating the selected nodes by hashing a resource entity replica identifier to generate a distributed hash table correspondence between the selected nodes and hashed resource entity replica identifiers;

requesting by the requester for a requested resource entity from a selected one node, including:

communicating a local copy count of the requestor for a number of replicas to the selected one node, estimating an extent of awareness of a current total number N of replicas by observing an awareness of local requests, and, assessing by the selected one node whether the requestor is aware of the current total number N of replicas; and, responding to the request, including:

locally assessing a quality of service measure to the request by the selected one node, when the quality of service measure meets a predetermined standard, replicating or removing the resource entity at a non-requesting node to provide a second plurality of replicas of the resource entity in additional or fewer ones of the nodes, respectively, for enhanced distributed access thereto, and, appending a variable number identifier associated with each corresponding replica of the first plurality of replicas after and in response to the replicating or the removing of the resource entity;

wherein the variable number identifier is based on a value of the current total number (N) of replicas.

2. The method of claim 1 wherein the resource entity comprises one of a music, video, data, or software processing file.

3. The method of claim 1 wherein the assessing comprises a dynamic determining of the quality of service measure at each of the selected ones of the nodes of the first plurality.

4. The method of claim 1 wherein the assessing comprises a real time determining by at least one of the selected ones of the nodes of the first plurality.

5. The method of claim 1, wherein the requesting further includes:
   requesting a desired replica by randomly selecting a number between 1 and N;
   associating the randomly selected number with a resource entity identifier to form a resource entity replica identifier;
   hashing the resource entity replica identifier for identifying the selected one node within the first plurality having the requested replica; and,
   addressing the requesting to the selected node.

6. The method of claim 5 wherein the assessing the quality of service measure of the request comprises detecting one of request response time, node queue length, node storage space consumption, node service competition, node resource utilization, node load balancing, request scheduling, processing cycles consumption or peripheral availability.

7. The method of claim 5 further including providing the desired one of the resource entity replicas with an indication of the number N of replicas within the node networks.

8. The method of claim 5 wherein if a requested resource entity replica is unavailable, the requester resubmits the request by selecting no more than one untried selected number between 1 and N, associating the untried selected number with the resource entity identifier to form the resource entity replica identifier, hashing the associated resource entity replica identifier for identifying a selected node within the first plurality of nodes having the requested replica, and addressing the requesting of the desired one of the resource entity replicas to the selected node.

9. The method of claim 8 wherein the untried selected number is selected at random from the untried numbers between 1 and N.

10. The method of claim 8 wherein the untried selected number is selected as the closest integer less than the average of the last selected number and 1.

11. The method of claim 1 further comprising estimating an extent of awareness of the current total number N of replicas in the decision to further replicate or reduce the number of resource entity replicas.

12. The method of claim 1 further comprising incrementing the set of selected nodes and the set of resource entity replicas by selecting the node based on the N+1 resource entity replica identifier as an additional selected node for containing an additional resource entity replica, wherein the additional selected node is selected as corresponding to the N+1 resource entity replica based on the quality of service measure.

13. The method of claim 1 further comprising decrementing the set of selected nodes and the set of resource entity replicas by selecting the node corresponding to the $N^{th}$ resource entity replica identifier as a deselected node undergoing the deactivation or removal of the resource entity replica.

14. The method of claim 13, wherein the decrementing includes:
   decreasing a minimum replica count requirement when a predetermined threshold is met;
   marking for removal the replicas having indexes higher than the requirement, wherein the marked replicas are included at a node other than a requested node initiating a decrement request;
   delaying a removal of the marked replicas until an instance when services compete for resources of the marked replicas; and,
   decrementing the local replica count at the node storing the marked replica.

15. The method of claim 1 wherein each of the replicas of the resource entity is identified by a resource entity replica identifier.

16. The method of claim 15 wherein the resource entity replica identifier is computed using a resource entity identifier and the current total number N of replicas.

17. The method of claim 1 further including associating with each of the replicas the current total number N indicative of a total number of the replicas within the node networks.

18. The method of claim 17 further comprising communicating by a service replica response data and the current total number N indicative of a total number of the replicas within the node networks to the requestor with each request of a resource entity.

19. The method of claim 1 further comprising an indication of the replication or removal process to prevent attempted multiple simultaneous replications and removals.

20. A system for adjusting a number N of replicas of a resource within a distributed network wherein a network node dynamically and independently adds or deletes a replica based on demand for the resource,
   wherein addition of the replica is performed when a response time exceeds a predetermined threshold, the addition including:
      appending a current total number N of replicas of a resource to a new total number N+1;
      finding a service provider for an N+1 replica using a hashing function;
      duplicating service on a new node;
      notifying other replicas to increment their local replica count by 1; and,
      delaying updating the local replica count at a requester to the new total number N+1 until after a request is made;
   wherein deletion of the replica is performed when the response time does not exceed the predetermined threshold, the deletion including:
      decreasing a minimum replica count requirement;
      marking for removal the replicas having indexes higher than the requirement, wherein the marked replicas are included at a node other than a requesting node initiating a decrement request;
      delaying a removal of the marked replicas until an instance when services compete for resources of the marked replicas; and,
      decrementing the local replica count at the nodes storing the marked.

21. A distributed network of peer-to-peer nodes wherein a variable identifier based on a current total number N' of replicas of a resource is stored in a selected set of the nodes and wherein each of the selected set of the nodes associates the number N with the resource stored therein, the system comprising:
   (a) identifying by a requester a resource name and a local count of replicas N within a network
   (b) randomly selecting by the requestor a first instance number i, wherein the first instance number is selected between 1 and N (c) sending by the requestor a request to a first node in the set;

(d) updating a local knowledge of the requestor if the first node is maintaining copy of the resource, including:
   appending i to modify the resource name,
   hashing the modified resource name,
   returning to the requestor the resource and a current total number N' of available replicas, and,
   replacing the local count of replicas N with the current total number N' of available replicas; and, (e) responding to a failure to supply the resource and the current total number N' if the first node is not maintaining a copy of the resource, including:
   randomly selecting by the requestor a second instance number $i_2$, wherein the second instance number $i_2$, corresponds to a closest integer less than an average of the first instance number i and 1;
   sending by the requestor the request to a second node of the set, and,
   repeating actions (d) and (e) for the second node.

* * * * *